(12) United States Patent
Meeks et al.

(10) Patent No.: US 9,416,698 B2
(45) Date of Patent: Aug. 16, 2016

(54) FASTENING METHOD, ASSEMBLY AND STRUCTURE OF ENGINE OIL FILL EXTENSION TUBE

(71) Applicant: Honda Motor Co., Ltd., Tokyo (JP)

(72) Inventors: Christopher D. Meeks, Greensboro, NC (US); Nathaniel A. Lenfert, Graham, NC (US)

(73) Assignee: Honda Motor Co., Ltd., Tokyo (JP)

( * ) Notice: Subject to any disclaimer, the term of this patent is extended or adjusted under 35 U.S.C. 154(b) by 86 days.

(21) Appl. No.: 14/276,833

(22) Filed: May 13, 2014

(65) Prior Publication Data

US 2015/0328730 A1    Nov. 19, 2015

(51) Int. Cl.
*B23P 19/04*    (2006.01)
*B67C 11/02*    (2006.01)
*B65D 25/48*    (2006.01)
(Continued)

(52) U.S. Cl.
CPC ............ *F01M 11/0458* (2013.01); *B23P 19/04* (2013.01); *B65D 25/48* (2013.01); *B67C 2011/027* (2013.01); *F01M 11/04* (2013.01); *F01M 2011/0491* (2013.01);
(Continued)

(58) Field of Classification Search
CPC . B23P 19/042; B23P 19/04; Y10T 29/49963; Y10T 29/49947; Y10T 29/49948; B67C 2011/027; B67C 11/02; B67C 11/00; B65D 25/48; B65D 39/086; B65D 39/084; B65D 41/0442; B65D 41/0435; B65D 41/04; F01M 11/0458; F01M 11/04; F01M 2011/0491; B65B 39/00; F01P 11/0214; B60K 2015/0438; B60K 2015/0432; B60K 15/04; B60K 15/0406; F16B 39/32

USPC .............. 29/525.11; 141/337, 338, 332, 340; 285/201, 202, 206, 219, 360, 362, 376, 285/377, 319; 220/86.1, 86.2; 411/516, 411/521, 520, 326, 330, 331, 226; 403/367, 403/371, 372
See application file for complete search history.

(56) References Cited

U.S. PATENT DOCUMENTS 523,878 A * 7/1894 Bickell .................... F16B 39/32
411/326
2,275,058 A * 3/1942 Draving .................. F16B 21/20
411/521
(Continued)

FOREIGN PATENT DOCUMENTS

EP    2354480    11/2010
EP    2354480 A1 *  8/2011 ............ F01M 11/04

*Primary Examiner* — Moshe Wilensky
*Assistant Examiner* — Bayan Salone
(74) *Attorney, Agent, or Firm* — Jenkins, Wilson, Taylor & Hunt, P.A.

(57) ABSTRACT

Fastening method, assembly and structure of engine oil fill extension tube can include an oil fill extension tube and a self-locking washer. The oil fill extension tube can include a plurality of locking edges disposed towards a first distal end of the oil fill extension tube, where the plurality of locking edges can define boundaries of a plurality of slots. The self-locking washer can include a plurality of teeth disposed on its top surface. The self-locking washer can be oriented over an opening in the oil pan, after which the oil fill extension tube can be threaded into the opening. The plurality of slots and plurality of teeth can be ratcheted together to fasten the oil fill extension tube into the oil pan when the oil fill extension tube is rotated clockwise. The washer can further include a locking extension to securely engage a portion of the oil pan.

18 Claims, 6 Drawing Sheets

(51) Int. Cl.
  *F01M 11/04* (2006.01)
  *B65B 39/00* (2006.01)
  *F01P 11/02* (2006.01)
  *B65D 39/08* (2006.01)
  *B65D 41/04* (2006.01)
  *B60K 15/04* (2006.01)
  *F16B 39/32* (2006.01)

(52) U.S. Cl.
  CPC ........... *F16B 39/32* (2013.01); *Y10T 29/49963* (2015.01); *Y10T 29/49964* (2015.01); *Y10T 29/53* (2015.01)

(56) References Cited

U.S. PATENT DOCUMENTS

| | | | | |
|---|---|---|---|---|
| 2,577,319 A * | 12/1951 | Rudolf | ................... | F16B 21/20 411/521 |
| 2,712,262 A * | 7/1955 | Knohl | ................... | F16B 21/20 411/521 |
| 3,352,344 A * | 11/1967 | Lanius, Jr. | ............... | F16B 39/24 411/145 |
| 3,483,789 A * | 12/1969 | Wurzel | ................... | F16B 21/20 411/517 |
| 3,608,933 A * | 9/1971 | Lee | ....................... | E21B 17/043 285/334 |
| 4,020,970 A * | 5/1977 | Koscik | ................... | F01M 11/04 220/293 |
| 4,139,038 A * | 2/1979 | Haussermann | ......... | F16B 39/14 411/247 |
| 4,339,055 A * | 7/1982 | Hutzenlaub | ........ | B60K 15/0406 220/293 |
| 4,426,027 A * | 1/1984 | Maynard, Jr. | ........ | B65D 47/063 222/529 |
| 4,462,620 A * | 7/1984 | Bambenek | ............ | B60K 15/04 220/86.2 |
| 4,515,245 A * | 5/1985 | Salmon | ................. | F01M 11/04 141/331 |
| 4,811,763 A * | 3/1989 | Kupske | ................... | B62J 35/00 141/285 |
| 5,014,445 A * | 5/1991 | Martell | ................... | G01F 23/04 33/731 |
| 5,033,521 A * | 7/1991 | Martin | ................... | B65D 47/00 141/337 |
| 5,188,157 A * | 2/1993 | Lee | ........................ | B67C 11/02 141/330 |
| D367,067 S * | 2/1996 | Speer | ........................... | D15/150 |
| 5,529,201 A * | 6/1996 | Tallent | ................. | B60K 15/0406 220/298 |
| 5,713,318 A * | 2/1998 | Tausk | ................... | F01M 11/04 123/195 C |
| 5,720,328 A * | 2/1998 | Ott | ........................ | B60K 15/04 141/301 |
| 5,897,277 A * | 4/1999 | Barre | ................... | F01D 21/003 411/120 |
| 6,202,882 B1 * | 3/2001 | Hagano | ................. | B60K 15/04 220/203.06 |
| 6,227,782 B1 * | 5/2001 | Bowling | ............... | F16B 35/048 411/114 |
| 6,308,852 B1 * | 10/2001 | Hagano | ............... | B60K 15/0406 220/293 |
| 6,363,905 B1 * | 4/2002 | Davis | .................... | F01M 11/04 123/196 R |
| 6,508,374 B1 * | 1/2003 | Griffin | ............... | B60K 15/0406 220/288 |
| D480,952 S * | 10/2003 | Kovac | ........................... | D8/399 |
| 6,705,481 B2 * | 3/2004 | Temmesfeld | ....... | B60K 15/0406 141/350 |
| D489,968 S * | 5/2004 | Kovac | ........................... | D8/399 |
| 7,347,302 B2 * | 3/2008 | Estacio | ............. | F01M 11/0408 184/92 |
| 7,415,997 B2 * | 8/2008 | Cisternino | ............. | B60K 15/04 141/312 |
| 7,635,013 B2 * | 12/2009 | Ballinger | ................ | B67C 11/00 141/331 |
| 7,878,554 B2 * | 2/2011 | Le Bars | .................. | F16B 21/18 285/319 |
| 7,896,186 B2 | 3/2011 | Behnamrad et al. | | |
| 7,963,567 B2 * | 6/2011 | Gallardo | .................... | F16L 5/08 285/139.1 |
| 7,987,816 B1 * | 8/2011 | Walsh | .................. | A01K 5/0114 119/61.5 |
| 8,011,396 B1 * | 9/2011 | Harvey | ................. | B65B 39/001 141/330 |
| 8,033,578 B2 * | 10/2011 | De Wilde | ............. | F16L 37/091 285/340 |
| 8,287,006 B2 * | 10/2012 | Pedersen | ............. | F16L 37/0925 285/104 |
| 8,622,102 B2 * | 1/2014 | Yager | ..................... | B60K 15/04 141/350 |
| 8,641,101 B2 * | 2/2014 | Guclucan | ................ | F01D 25/18 285/220 |
| 8,678,444 B2 * | 3/2014 | Le Quere | ................ | F16L 17/06 285/106 |
| 8,720,721 B2 * | 5/2014 | Dutzi | ................. | B60K 15/0406 220/295 |
| 8,777,534 B2 * | 7/2014 | Wallbaum | ............... | H01R 13/44 411/103 |
| 8,807,896 B2 * | 8/2014 | McKinlay | ............... | F16B 39/24 411/147 |
| 9,016,499 B2 * | 4/2015 | Scholz | ............... | F01M 11/0458 220/287 |
| 2006/0086736 A1 * | 4/2006 | Keller | ................ | B60K 15/0406 220/295 |
| 2007/0256755 A1 * | 11/2007 | King | ........................ | B67C 11/02 141/340 |
| 2008/0023103 A1 * | 1/2008 | Ballinger | .................. | B67C 11/00 141/338 |
| 2011/0192843 A1 * | 8/2011 | Anello | ................... | F01M 11/04 220/86.2 |
| 2012/0217240 A1 | 8/2012 | Dutzi et al. | | |
| 2012/0267006 A1 * | 10/2012 | Liao | ........................ | B67C 11/02 141/331 |
| 2012/0273079 A1 * | 11/2012 | Guclucan | ............... | F01D 25/18 138/109 |
| 2013/0306631 A1 * | 11/2013 | Scholz | ............... | F01M 11/0458 220/86.2 |

* cited by examiner

FASTENING METHOD, ASSEMBLY AND STRUCTURE OF ENGINE OIL FILL EXTENSION TUBE

TECHNICAL FIELD

The present subject matter generally relates to a small engine assembly. More particularly, the subject matter relates to a fastening method, assembly and structure of an engine oil fill extension tube for powered equipment.

BACKGROUND

For small engines used in powered equipment (e.g. lawnmowers, tractors, forestry equipment, etc.) a mounting assembly is typically needed to attach the oil fill extension tube to the oil pan of the engine. In conventional mounting assembly configurations, a bracket can be mounted onto a surface of the oil fill extension tube, a washer can be bent to lock onto a portion of the oil fill extension tube or the tube itself can be bolted to the engine. However, such configurations generally require a mounting assembly operation. These mounting assembly operations can comprise, for example, brazing a bracket onto a surface of the oil fill extension tube, molding a collar onto the oil fill extension tube, bending a washer around an exterior of the oil fill extension tube, etc. Consequently, such mounting assembly operations can overcomplicate and increase the expense of the basic assembly of inserting and fastening the oil fill extension tube within the oil pan.

As a result, a need exists for a fastening method, assembly and structure of an engine oil fill extension tube that eliminates mounting assembly operations; is cost-effective; is ergonomic for factory associates; and is efficient.

SUMMARY

In accordance with this disclosure, a fastening method, assembly, and structure of an engine oil fill extension tube are provided. The fastening method, assembly and structure of an engine oil fill extension tube can provide advantageous and unexpected results, including, for example, reduced cost, simplification and improvement of fastening method, and elimination of mounting assembly operational steps.

In one aspect, the present subject matter discloses a method of fastening an oil fill extension tube into an oil pan. For example, the method can comprise orienting a self-locking washer over a threaded opening in the oil pan and threading a first distal end of the oil fill extension tube into the threaded opening. The self-locking washer can comprise a plurality of teeth disposed on a top surface of the self-locking washer, while the oil fill extension tube can comprise a plurality of locking edges, the plurality of locking edges being disposed towards the first distal end of the oil fill extension tube and defining boundaries of a plurality of slots. The method can further comprise ratcheting together the plurality of slots and the plurality of teeth to fasten the oil fill extension tube into the oil pan.

In another aspect, the present subject matter discloses an assembly for fastening an oil fill extension tube into an oil pan. The assembly can comprise a self-locking washer and oil fill extension tube. The self-locking washer can comprise a plurality of teeth disposed on a top surface of the self-locking washer and the oil fill extension tube can comprise plurality of locking edges disposed towards a first distal end of the oil fill extension tube and defining boundaries of a plurality of slots. The assembly can be configured wherein the self-locking washer can be oriented over a threaded opening in the oil pan and the plurality of slots and the plurality of teeth can be ratcheted together when the first distal end of the oil fill extension tube is threaded into the threaded opening of the oil pan.

In a further aspect, the present subject matter discloses an oil fill extension tube for threading into a threaded opening of an oil pan. For example, the oil fill extension tube can comprise a longitudinally extending body comprising a first distal end and a second distal end. The first distal end can be externally threaded. The oil fill extension tube can further comprise a plurality of locking edges disposed towards the first distal end of the oil fill extension tube and defining boundaries of a plurality of slots. In this aspect, rotation of the oil fill extension tube in a clockwise direction, with respect to a longitudinal axis of the oil fill extension tube, can ratchet together the plurality of slots and a plurality of teeth disposed on a top surface of a self-locking washer that is oriented over the threaded opening of the oil pan.

These and other objects of the present disclosure as can become apparent from the disclosure herein are achieved, at least in whole or in part, by the subject matter disclosed herein.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides and/or includes a fastening method, assembly, and structure of an engine oil fill extension tube for powered equipment. In some aspects, the fastening method, assembly, and structure can be used in a powered machine having an engine, such as a two-stroke or four-stroke internal combustion engine or a hybrid engine.

Aspects of the present subject matter now will be described more fully hereinafter with reference to the accompanying drawings, in which some aspects of the present subject matter are shown. This present subject matter may, however, be embodied in many different forms and should not be construed as limited to the embodiments set forth herein. Like numbers refer to like elements throughout.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the package or component in addition to the orientation depicted in the figures. For example, if the package or component in the figures is turned over, structure or portion described as "above" other structures or portions would now be oriented "below" the other structures or portions. Likewise, if the package or component in the figures are rotated along an axis, structure or portion described as "above", other structures or portions would be oriented "next to" or "left of" the other structures or portions.

Unless the absence of one or more elements is specifically recited, the terms "comprising", including", and "having" as used herein should be interpreted as open-ended terms that do not preclude the presence of one or more elements.

Figure 1A:
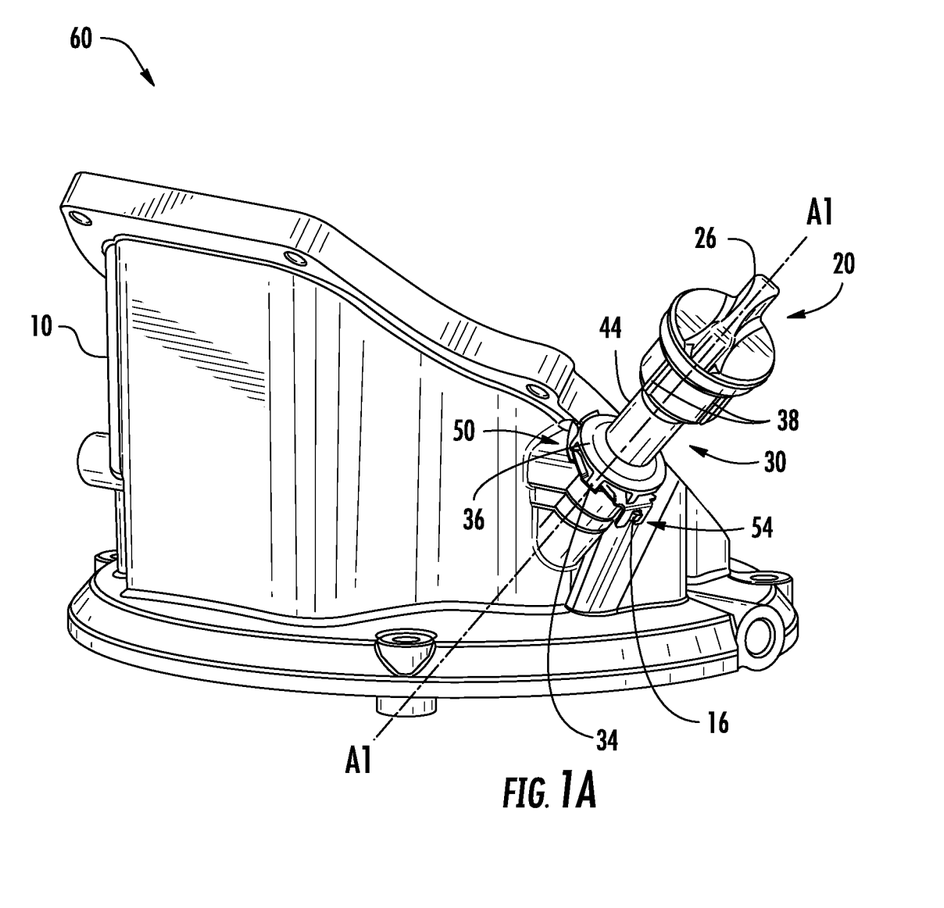
FIG. 1A is a perspective view illustrating an assembly of an oil fill extension tube according to aspects of the subject matter described herein.
Figure 1B:
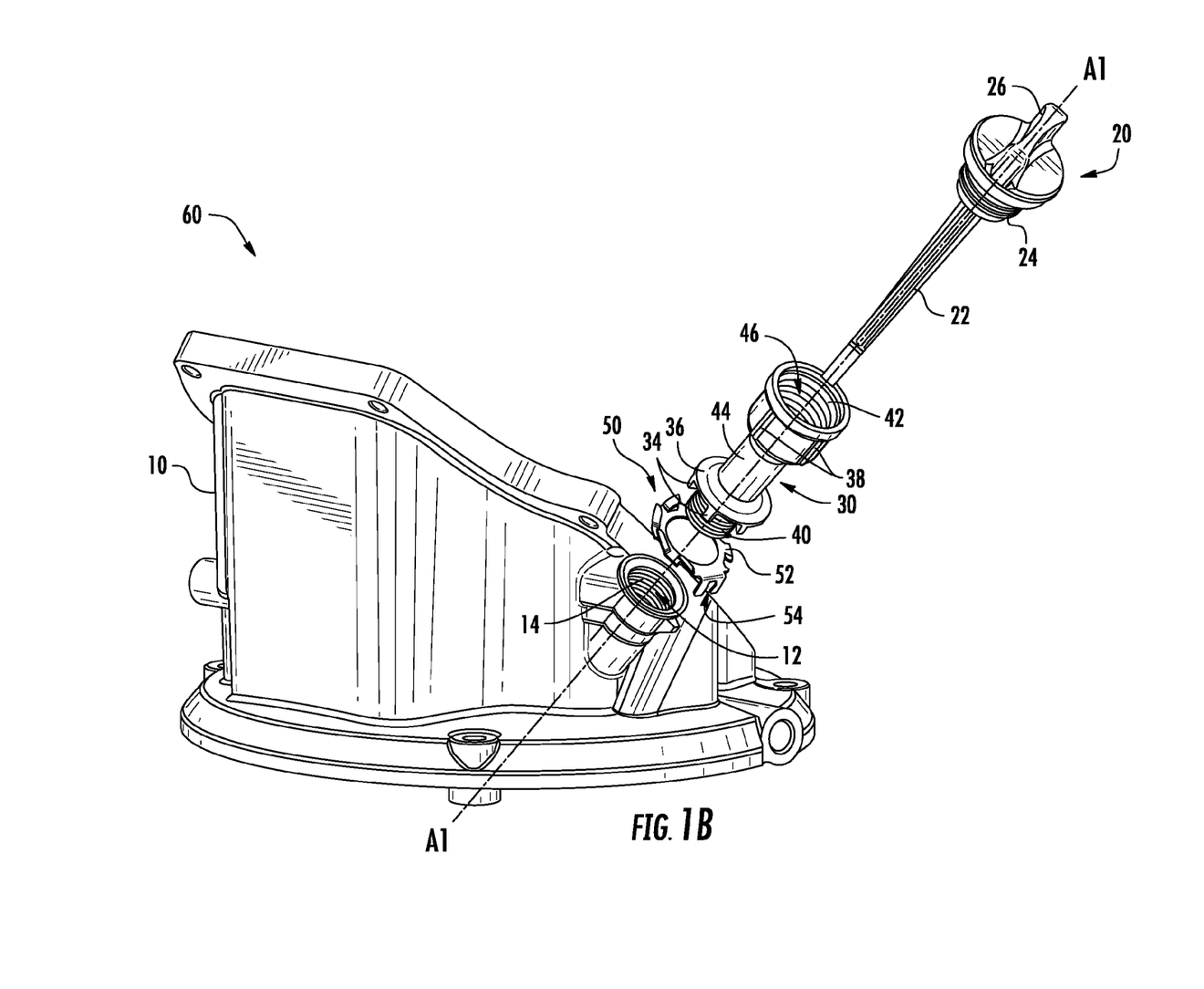
FIG. 1B is an exploded view illustrating the assembly of the oil fill extension tube according to FIG. 1A.

As shown in FIGS. 1A-1B, for example, an oil pan assembly, generally designated 60, can comprise an oil pan 10, an oil level stick 20, an oil fill extension tube 30, and a locking washer 50. The oil pan 10 can comprise an opening 12 in which a quantity of oil can be stored in order to lubricate an engine (not shown). In order to measure the quantity of oil within oil pan 10, oil level stick 20 can be inserted into opening 12 and subsequently removed. A body 22 of oil level stick 20 can have markings disposed at periodic intervals along its length indicating measurements, amounts, etc. of oil that is currently stored within oil pan 10. For example, the quantity of oil in oil pan 10 can be determined based on which markings of body 22 are coated in oil when oil stick 20 is removed from oil pan 10. Depending on the circumstances, measurement of the oil level within oil pan 10 can provide an indication of whether more oil should be added or oil should be removed from oil pan 10.

Oil level stick 20 can be removably secured to oil pan 10 in a manner that eliminates modifications or mounting assembly operations of extraneous parts; in contrast with traditional oil pan assemblies. Traditionally, oil level sticks have been removably secured to oil pans by oil fill extension tubes secured to the oil pan through assembly operations that require extra components and multiple assembly steps. For example, some oil pan assemblies have included a bracket mounted onto a surface of the oil fill extension tube, a washer bent to lock onto a portion of the oil fill extension tube or a bolt(s) securing the oil fill extension tube, itself, to the engine surface. The addition of such components includes the extra operational steps of, for example, brazing the bracket to a surface of the extension tube, molding a collar onto the extension tube, bending the washer around a surface of the oil fill extension tube, etc., in addition to the basic assembly of the necessary components of the oil pan assembly. Moreover, these assemblies have traditionally required modification in the form of attaching extra material to a surface of the engine in order to accept installation of the oil fill extension tube. Such traditional mounting assembly operations are considered undesirable because they over-complicate and increase the expense of the basic assembly of inserting and fastening the oil fill extension tube within the oil pan.

In the presently disclosed subject matter, as seen in FIG. 1B, for example, oil pan assembly 60 can be self-locking and closing, which enables assembly 60 to be assembled without the modification of either oil pan 10 or a surface of the engine (not shown). Oil level stick 20 can be inserted into opening 12 along axis A1 of assembly 60 and can be removably secured in place by oil fill extension tube 30 and self-locking washer 50.

In one aspect, self-locking washer 50 can be affixed over opening 12 of oil pan 10. Opening 12 can extend for a certain distance axially into oil pan 10 and open into an internal cavity (not shown) of oil pan 10 and/or can extend externally to oil pan 10 along axis A1. Opening 12 can be internally and circumferentially threaded with threads 14 at a mouth of opening 12, where threads 14 can correspond and engage with external threads 40 disposed at a first distal end of oil fill extension tube 30. Opening 12 can have any shape, such as a circular shape, which can correspond with a shape of a central opening in washer 50. The central opening of washer 50 can have a diameter that is the same as or is slightly larger than a diameter of opening 12. Accordingly, washer 50 is configured to rest on top of opening 12 without interfering with the dimensions of opening 12.

Washer 50 additionally can comprise a locking tab/extension 54 extending orthogonally to a top surface 56 of washer 50. Locking tab 54 can cooperate and engage with a notch 16 disposed on an outer surface of oil pan 10 when locking tab 54 is aligned with notch 16. For example, locking tab 54 can comprise two prongs that slide on either side of notch 16 and sandwich notch 16 therebetween. Notch 16 can function as a locking mechanism to prevent washer 50 from rotating about axis A1 on top of opening 12. Other means for securing washer 50 to oil pan 10 can be used; however, it is desirable that such means do not require additional assembly operational steps. Because washer 50 is self-locking, unnecessary assembly operations can be eliminated through implementation of self-locking washer 50 in assembly 60. In order to secure oil fill extension tube 30 to oil pan 10, self-locking washer 50 can further comprise a plurality of teeth 52 angled at a certain pitch, which will be described in further detail below. (See, FIGS. 4A-4B).

Oil fill extension tube 30 can be inserted along axis A1 into opening 12 after washer 50 has been oriented on top of opening 12, such that locking tab 54 is in alignment with notch 16. Oil fill extension tube 30 can comprise the first distal end, which can be circumferentially threaded with external threads 40. External threads 40 can have a corresponding angle, lead, pitch, etc. as opening threads 14 so that the two sets of threads can engage when oil fill extension tube 30 is rotated clockwise about axis A1. Oil fill extension tube 30 can further comprise an outer projection 36, which radially projects away from a body 44 of oil fill extension tube 30. In some aspects, a bottom surface of outer projection 36, facing the first distal end, can comprise a plurality of slots 32 and a plurality of locking edges 34, to be described in further detail below. (See, FIGS. 3A-3C).

Figure 2A:
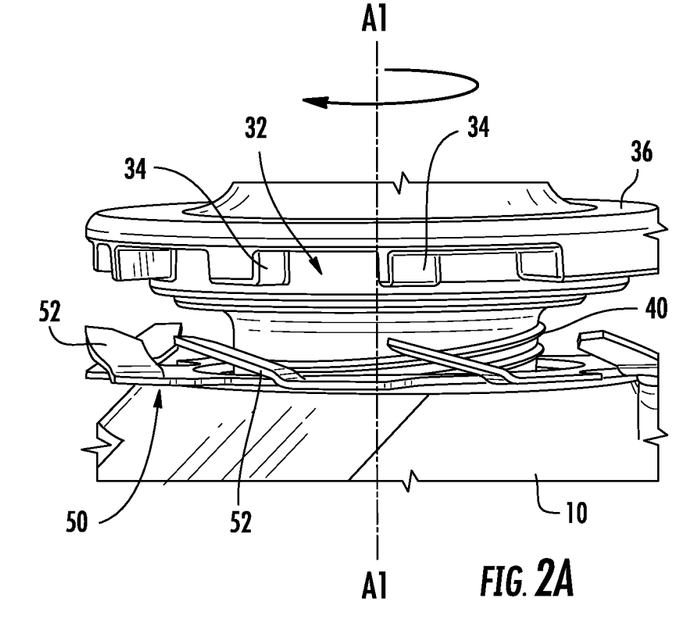
FIG. 2A is an enlarged view illustrating clockwise rotation of an oil fill extension tube according to aspects of the subject matter described herein.

As illustrated in FIG. 2A, oil fill extension tube 30 can be rotated clockwise about axis A1, whereby external threads 40 of oil fill extension tube 30 and threads 14 of opening 12 can engage. Oil fill extension tube 30 can be rotated in a clockwise direction until top surfaces of locking edges 34 are in contact with or are close to top surface 56 of washer 50. During rotation, as the top surface of locking edges 34 come into contact with teeth 52 of washer 50, locking edges 34 can easily pass over angled upper surfaces of teeth 52 to continue rotation in the clockwise direction. During this clockwise rotation, washer 50 is prevented from also rotating due to engagement of locking tab 54 with notch 16. Once oil fill extension tube 30 is rotated clockwise to a point where both sets of threads 14 and 40 are either mostly or fully threaded with one another, oil fill extension tube 30 can be considered to be in total engagement with opening 12. Alternatively, total engagement of oil fill extension tube 30 can also be determined based on a specified torque range, where the torque range can be determined during manufacture. Regardless, at this point, oil fill extension tube 30 can be secured in place with respect to opening 12 and thus prevented from being removed from opening 12.

Figure 2B:
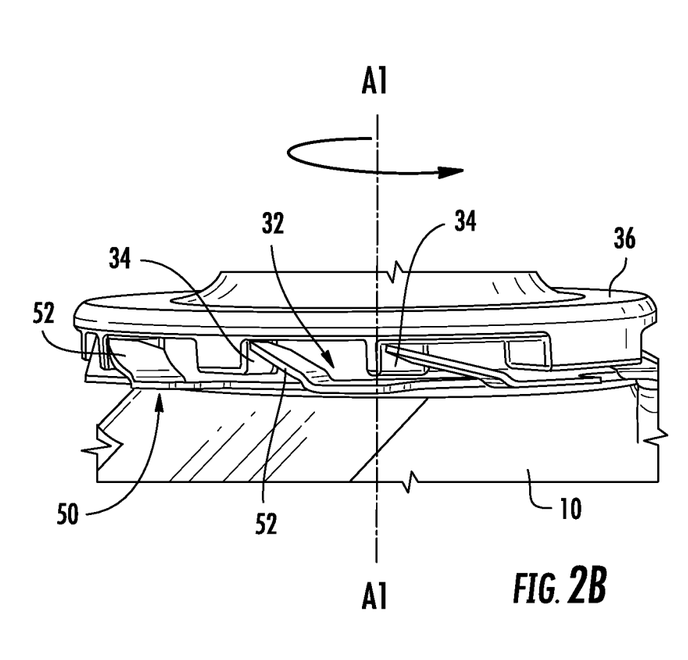
FIG. 2B is an enlarged view illustrating counterclockwise rotation of the oil fill extension tube according to FIG. 2A.

As illustrated in FIG. 2B, plurality of teeth 52 can act as a self-locking ratchet, which allow rotation of oil fill extension tube 30 in a clockwise direction, but prevent or otherwise allow only minimal rotation in the counterclockwise direction, with respect to axis A1. Thus, rotating oil fill extension tube 30 counterclockwise about axis A1 can result in locking edges 34 of oil fill extension tube 30 hitting an uppermost edge of teeth 52, which prevents external threads 40 from being threadingly disengaged from threads 14 of opening 12. The amount of movement that oil fill extension tube 30 can make when rotated counterclockwise about axis A1 is limited to a distance between a locking edge 34 and an uppermost edge of one of teeth 52 when oil fill extension tube 30 is totally threaded. This limited counterclockwise rotation can be known as "backlash". In this configuration, each of plurality of teeth 52 can act as a ratchet due to their pitch measured from top surface 56 of washer 50.

The pitch of teeth 52 enables them to angularly extend from top surface 56 in a radially clockwise direction, so that when oil fill extension tube 30 is rotated clockwise, the plurality of self-locking edges 34 can slide over the angled outer surface of each of plurality of teeth 52. Conversely, the pitch of teeth 52 can limit significant rotation of oil fill extension tube 30 in a counterclockwise direction because upon rotation in the counterclockwise direction locking edges 34 are rotated into an uppermost edge of teeth 52, where the uppermost edges are angled radially clockwise and facing outward with respect to axis A1.

Once oil fill extension tube 30 is totally or at least substantially engaged within opening 12, oil level stick 20 can be inserted along axis A1, through a longitudinally extending opening 46 of oil fill extension tube 30, through washer 50 and into opening 12. Oil level stick 20 can comprise an elongated body 22, a handle 26 and an externally threaded portion 24 disposed between elongated body 22 and handle 26. Elongated body 22 can have a length that is long enough to extend into opening 46 and through a total length of oil fill extension tube 30, through washer 50 and into opening 12. Elongated body 22 can be tapered along its axial length, with its greatest diameter disposed towards the externally threaded portion 24. Opening 46 of oil fill extension tube 30 can comprise a diameter that is large enough to accommodate the greatest diameter of elongated body 22. Elongated body 22 can additionally comprise markings disposed at regular or irregular intervals to indicate various levels or measurements of oil quantity within oil pan 10.

Externally threaded portion 24 can be circumferentially threaded, with threads having a corresponding angle, lead, pitch, etc. as internal threads 42 of oil fill extension tube 30. Internal threads 42 can be disposed on a second distal portion of oil fill extension tube 30. Handle 26 can comprise a structure that comfortably allows digital manipulation of oil level stick 20. For example, handle 26 can comprise a raised portion that enables an operator to comfortably grasp and rotate handle 26 about axis A1. Consequently, rotating handle 26 clockwise about axis A1 can cause externally threaded portion 24 to threadingly engage with internal threads 42 of oil fill extension tube 30. Once oil level stick 20 is rotated clockwise to a point where both sets of threads 24 and 42 are either mostly or fully threaded with one another, oil level stick 20 can be considered to be fully secured within oil pan assembly 60, as illustrated in FIG. 1A. Conversely, handle 26 can be rotated counterclockwise about axis A1 to threadingly disengage externally threaded portion 24 from internal threads 42 in order to check the quantity of oil remaining in oil pan 10. Throughout the rotation of oil level stick 20, oil fill extension tube 30, washer 50 and opening 12 can remain securely engaged with one another.

Figure 3A:
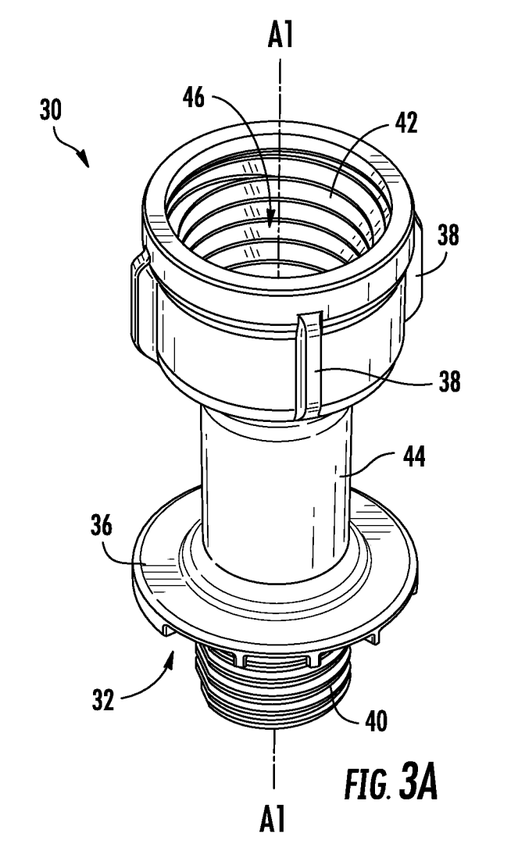
FIG. 3A is a top perspective view illustrating an oil fill extension tube according to aspects of the subject matter described herein.
Figure 3B:
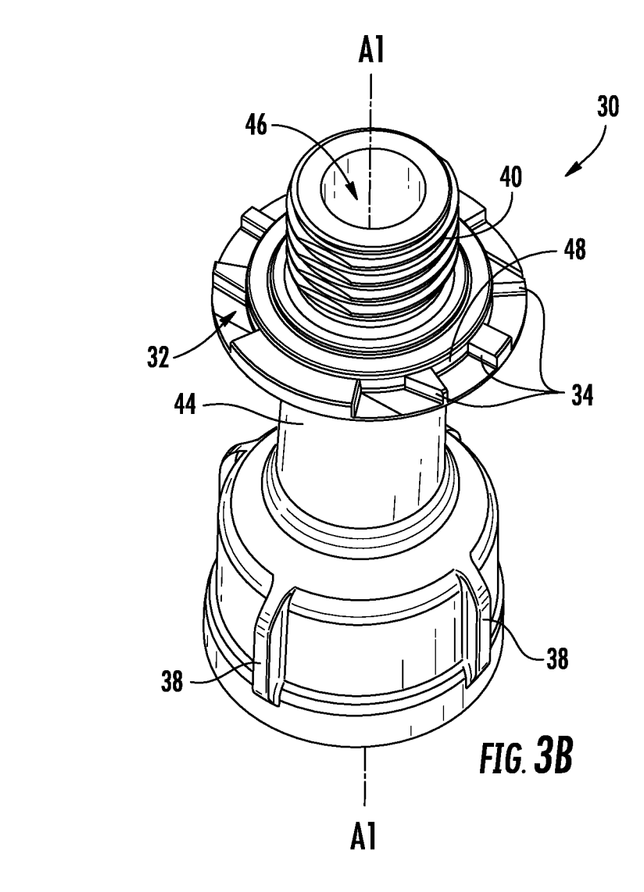
FIG. 3B is a bottom perspective view illustrating the oil fill extension tube illustrated in FIG. 3A.
Figure 3C:
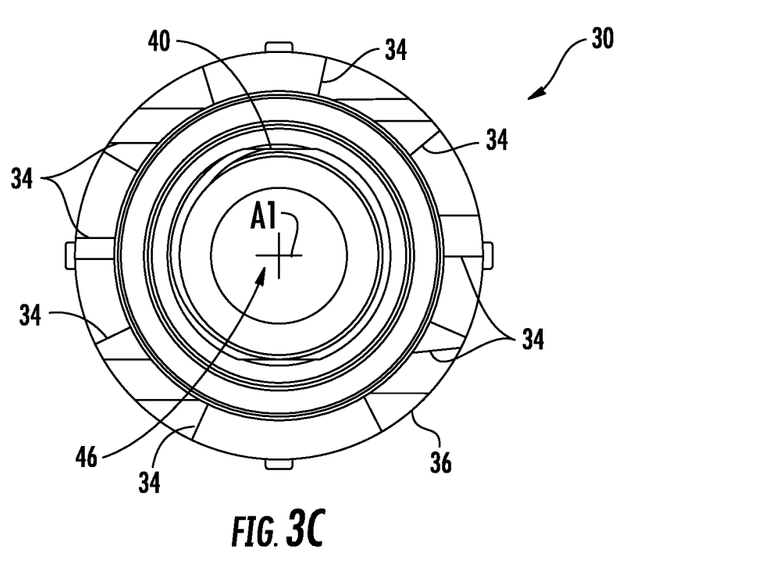
FIG. 3C is a bottom view illustrating the oil fill extension tube illustrated in FIG. 3A.

FIGS. 3A through 3C illustrate detailed views of oil fill extension tube 30. Oil fill extension tube 30 can be manufactured as one integral unit or can be separate components coupled to one another to form oil fill extension tube 30. Oil fill extension tube 30 can be substantially linear with a limited number of bends in the axial direction, or it can be totally linear. Extension tube body 44 can have a hollow cross-section of varying diameters and shapes. Regardless of the particular configuration of extension tube body 44, however, the smallest diameter of extension tube body 44 can be configured to still be larger than the largest diameter of elongated body 22 of oil level stick 20, but small enough to engage with opening 12. In one example, extension tube body 44 can be elongated along axis A1 with a constant, circular cross-sectional geometry that is entirely hollow throughout a length of oil fill extension tube 30. Other embodiments can be contemplated, as well.

Oil fill extension tube 30 can comprise first and second distal portions, which can be threaded. For example, external threads 40 can be disposed on the first distal portion, while internal threads 42 can be disposed on the second distal portion. In one aspect, a diameter of the first distal portion is smaller than a diameter of opening 12, such that external threads 40 can threadingly engage with threads 14 of opening 12 when oil fill extension tube 30 is rotated in the clockwise direction with respect to axis A1. In another aspect, a diameter of the second distal portion can be larger than a diameter of externally threaded portion 24, such that externally threaded portion 24 can threadingly engage with internal threads 42 when handle 26 of oil level stick 20 is rotated in the clockwise direction with respect to axis A1.

In some embodiments, the first and second distal portions have different external contours than one another. For example, the second distal portion can have a plurality of ribs 38 disposed on its outer surface. Plurality of ribs 38 can aid in torquing oil fill extension tube 30 during rotation of oil fill extension tube 30 into opening 12. In one aspect, there can be four ribs 38 disposed on the second portion, although more or less ribs 38 can also be sufficient. Oil fill extension tube 30 can further comprise an outer projection 36 radially extending from extension tube body 44 at the first distal portion. Outer projection 36 can extend so that it has a diameter substantially corresponding to an outermost diameter of washer 50, where both can be similar in size or larger than the diameter of opening 12. A top surface (i.e. surface facing second distal portion) of outer projection 36 can be substantially smooth, while a bottom surface (i.e. surface facing first distal portion) can comprise a plurality of slots 32 and a plurality of locking edges 34.

Plurality of locking edges 34 can be disposed on the bottom surface of outer projection 36. In one aspect, the bottom surface of outer projection 36 comprises a contoured surface having extruded portions and non-extruded portions (i.e. plurality of slots 32). The extruded portions can each have a width, depth and height that can determine the configuration of the plurality of teeth 52 on locking washer 50. Each extruded portion can comprise one or more of plurality of locking edges 34 on one of the edges bounding one of plurality of slots 32. An edge opposing each locking edge 34, which bounds a different one of plurality of slots 32, can be considered a "non-locking edge". When oil fill extension tube 30 is threaded into opening 12, rotation of oil fill extension tube 30 clockwise with respect to axis A1 results in a top surface of the extruded portions sliding over an angled outer surface of plurality of teeth 52 until oil fill extension tube 30 is threaded into place. Subsequently, attempting to rotate oil fill extension tube 30 counterclockwise with respect to axis A1 results in plurality of locking edges 34 bearing against uppermost edges of plurality of teeth 52 acting as stoppers. In one aspect, locking edges 34 can be manufactured from a material that is similar in durability and hardness to a material that teeth 52 are manufactured from, in order to prevent unwanted pliability and/or bowing of locking edges 34 when bearing against teeth 52.

Locking edges 34 can be configured in such a manner that there can be a corresponding number of locking edges 34 and plurality of slots 32. In one aspect, there can be eight locking edges 34, each one disposed per each of eight slots 32. Locking edges 34 can further correspond to a number of plurality of teeth 52, so that there can be an equal or less number of teeth 52 than there are plurality of locking edges 34 and/or plurality of slots 32. For example, if oil fill extension tube 30 is configured with eight locking edges 34 and eight slots 32, there can be seven teeth 52. Different configurations of numbers of locking edges 34, slots 32, and tabs 54 can also be utilized.

Disposition of plurality of locking edges 34 can depend on the depth, width, and height of the extruded portions. In one aspect, the extruded portions can extend at a depth from a projection body 48 to an outer circumference of outer projection 36. The extruded portions can also have a width that depends upon the angle at which locking edge 34 extends from projection body 48 and a spacing between each pair of non-locking edge and locking edge 34. For example, locking edges 34 of the extruded portions can extend from projection body 48 in a manner that can be either angled or orthogonal in relation to a surface of projection body 48, such that extruded portions have a width larger or smaller towards the outer circumference of projection 36 and a smaller or larger width towards the surface of projection body 48 (i.e. extruded portions can be "pie-shaped"). Additionally, extruded portions can be evenly or unevenly spaced apart from one another. As illustrated in FIG. 3C, the extruded portions are unevenly spaced from one another, such that as oil fill extension tube 30 is ratcheted with washer 50 approximately seven degrees)(° can be provided between each locking click of self-locking washer 50. Thus, each extruded portion can have a different or similar width, with some extruded portions being substantially less wide than some of other extruded portions. Moreover, a height of each extruded portion can be larger than, approximately equal to or slightly less than a pitch of each of teeth 52, where the pitch is measured from top surface 56 of washer 50 to the uppermost edge of teeth 52. Where the height of each of extruded portion is configured to be slightly less than the pitch of each of teeth 52, the height of each locking edge 34 cannot be less than a distance between the uppermost edge of teeth 52 and the bottom surface of projection 36 when oil fill extension tube 30 has been fully threaded into opening 12.

Plurality of slots 32 can comprise a quantity of slots or recesses integrally spaced around the bottom surface of outer projection 36 and formed between the locking edge 34 of one extruded portion and the non-locking edge of another extruded portion. In one aspect, dimensions of plurality of slots 32 can be determined by the width, depth and height of each extruded portion that defines each slot 32. Consequently, plurality of slots 32 can be of different or similar dimensions, but each must be large enough to receive a one of plurality of teeth 52. In some aspects, arrangement of slots 32 can correspond to the arrangement of teeth 52 disposed on locking washer 50. For example, plurality of slots 32 can be configured as any number of slots that correspond with the number of teeth 52 on locking washer 50. In some aspects, there can be eight slots 32 disposed between eight locking edges 34 that correspond with seven teeth 52. However, more or less slots 32 can be utilized.

Figure 4A:
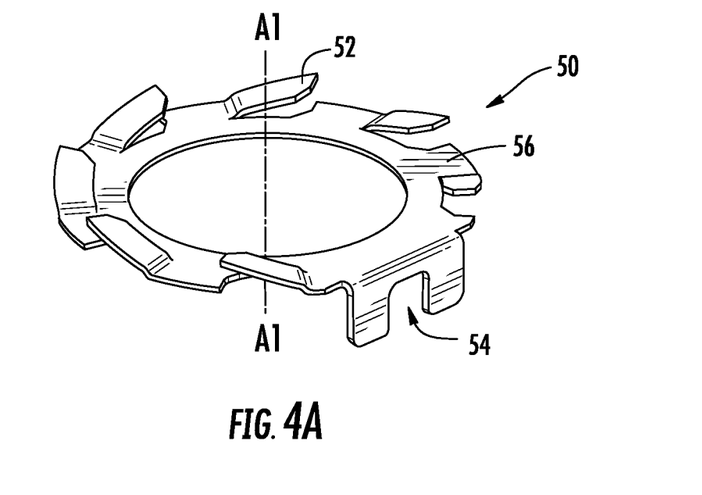
FIG. 4A is a top perspective view illustrating a self-locking washer according to aspects of the subject matter described herein.
Figure 4B:
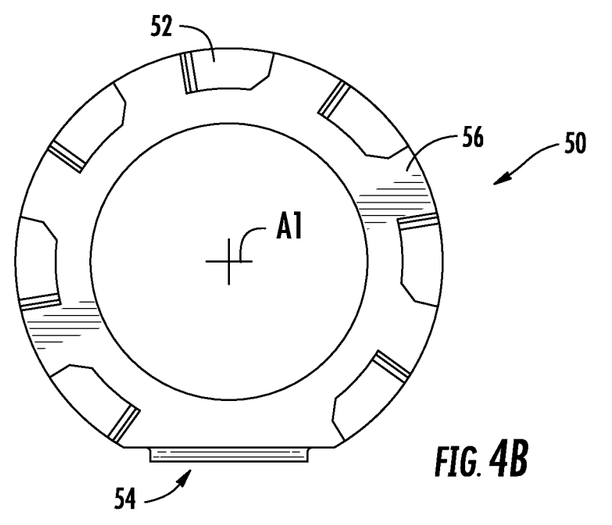
FIG. 4B is a top view illustrating the self-locking washer illustrated in FIG. 4A.

FIGS. 4A and 4B illustrate perspective and top views of washer 50. As discussed above, self-locking washer 50 can comprise a top surface 56, a plurality of teeth 52 and a locking tab/extension 54. Washer 50 can have a shape complimentary to that of opening 12. For example, opening 12 can be a circular opening and washer 50 can have a circular shape (see FIG. 1B). Additionally, washer 50 can comprise an outer diameter and an inner diameter, the inner diameter referring to a central opening of washer 50. In such aspects, the inner diameter of washer 50 need be the same as or slightly larger than a diameter of opening 12. Similarly, the outer diameter of washer 50 can be substantially similar to or slightly larger than a diameter of opening 12, although the outer diameter of washer 50 must be larger than the inner diameter of washer 50. Accordingly, washer 50 is configured to be positioned on top of opening 12 without interfering with the dimensions of opening 12.

Extending orthogonally from top surface 56 of washer 50 is locking tab/extension 54, which can engage with notch 16 of oil pan 10. Locking tab 54 can be configured to slidingly engage with notch 16, such that each prong of locking tab 54 can slide on either side of notch 16, thereby effectively preventing rotation of locking washer 50 during ratcheting of oil fill extension tube 30. Locking tab/extension 54 can alternatively be configured in other manners that do not require a mounting assembly operation in order to be secured to oil pan 10. For example, locking tab/extension 54 could be configured as a clasp, snap, hinge, etc. Regardless, such a configuration of locking tab/extension 54 is advantageous because it eliminates the necessity of a mounting assembly operation for securing washer 50 to oil pan 10. Conventionally, after oil fill extension tubes have been threaded into oil pans, the metal washer has needed to be manually bent up around outer contours of the extension tube in order to prevent the washer from rotating. A mounting assembly operation of this type can be time consuming and have poor ergonomics for the assembly associate. Conversely, by configuring washer 50 with locking tab/extension 54, the mounting assembly operation is eliminated and washer 50 can merely be oriented over top of opening 12 so that locking tab/extension 54 can receive notch 16.

A plurality of teeth 52 can be disposed on top surface 56 of washer 50. Plurality of teeth 52 can be disposed on top surface 56 in a manner corresponding to the disposition of plurality of locking edges 34 and plurality of slots 32. For example, there can be seven teeth 52 disposed evenly about an outer circumference of washer 50. In comparison, there can be eight locking edges 34 and eight slots 32 on oil fill extension tube 30. Thus, when oil fill extension tube 30 is ratcheted onto washer 50, one of each of teeth 52 can be received within one of plurality of slots 32, i.e. FIG. 2B. Regardless, each of plurality of teeth 52 can be sized and shaped similarly or differently, but must be sized and shaped to be able to be received within one of plurality of slots 32. For example, each of teeth 52 can have a width and/or depth that is approximately a same or smaller than a width and/or depth as each of slots 32. Further, each of teeth 52 can have a height that varies due to a pitch of each of teeth 52 in relation to top surface 56. The pitch of each plurality of teeth 52 can be similar or different in relation to each other. In one aspect, each of plurality of teeth 52 can have a same pitch and extend off of top surface 56 of washer 50 at a pitch angle, which can be, for example, an acute angle. Thus, the height of each of plurality of teeth 52 can have a highest height between an uppermost edge of teeth 52 and top surface 56. As a result, each of plurality of slots 32 cannot have a height less than a distance between the uppermost edge of teeth 52 and the bottom surface of projection 36 when oil fill extension tube 30 has been fully threaded into opening 12.

Additionally, plurality of teeth 52 can all be angled from top surface 56 in a manner that corresponds to a direction of rotation of oil fill extension tube 30 that is required to thread oil fill extension tube 30 within opening 12. For example, where oil fill extension tube 30 is configured to be threaded into opening 12 by rotating oil fill extension tube 30 clockwise in relation to axis A1, then each of plurality of teeth 52 can be angled from top surface 56 in a clockwise pattern.

Figure 5:
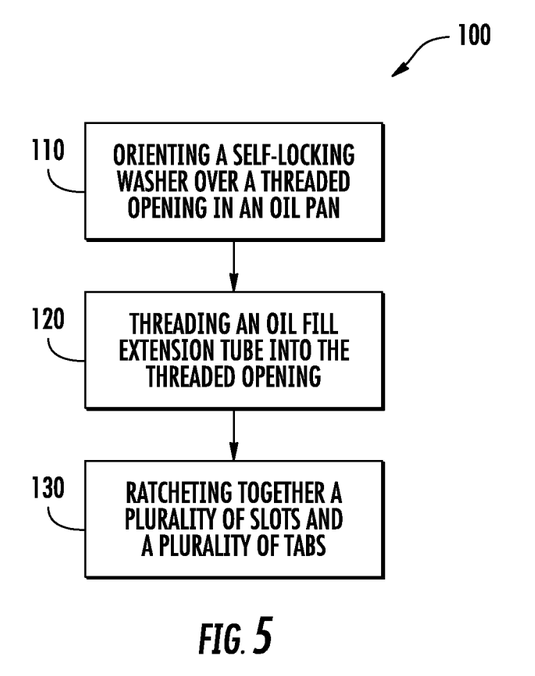
FIG. 5 is a flow chart illustrating an exemplary method of fastening an oil fill extension tube into an oil pan according to aspects of the subject matter described herein.

FIG. 5 is a flow chart illustrating an exemplary method, generally designated 100, of fastening an oil fill extension tube 30 into an oil pan 10 according to aspects of the subject matter described hereinabove. In some aspects, method 100 can consist of an orienting step 110. For example, orienting step 110 can comprise orienting a self-locking washer 50 over a threaded opening 12 in oil pan 10. Washer 50 can comprise a plurality of teeth 52 disposed on a top surface 56 of washer 50. A threading step 120 can be included in method 100. For example, threading step 120 can comprise threading a first distal end of oil fill extension tube 30 into threaded opening 12 in oil pan 10. Oil fill extension tube 30 can comprise a plurality of locking edges 34 defining boundaries of a plurality of slots 32 and disposed towards the first distal end of oil fill extension tube 30. Finally, method 100 can comprise a ratcheting step 130, where ratcheting step 130 can comprise, for example, ratcheting together plurality of slots 32 and plurality of teeth 52 to fasten oil fill extension tube 30 into oil pan 12.

While the present subject matter has been has been described herein in reference to specific aspects, features, and illustrative embodiments, it will be appreciated that the utility of the invention is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, aspects, modifications and alternative embodiments, within its scope and including equivalents of the claims.

What is claimed is:

1. A method of fastening an oil fill extension tube into an oil pan, comprising:
    orienting a self-locking washer over a threaded opening in the oil pan, the self-locking washer comprising a plurality of teeth disposed on a top surface of the self-locking washer and a locking extension disposed orthogonally to the top surface of the self-locking washer;
    securely engaging, by the locking extension of the self-locking washer, a portion of the oil pan after the self-locking washer is oriented over the threaded opening;
    threading a first distal end of the oil fill extension tube into the threaded opening, the oil fill extension tube comprising a plurality of locking edges, the plurality of locking edges disposed towards the first distal end of the oil fill extension tube and defining boundaries of a plurality of slots; and
    ratcheting together the plurality of slots and the plurality of teeth to fasten the oil fill extension tube into the oil pan.

2. The method of claim 1, wherein ratcheting together the plurality of slots and the plurality of teeth comprises rotating the oil fill extension tube clockwise with respect to a longitudinal axis of the oil fill extension tube until the oil fill extension tube is fully threaded into the threaded opening, such that the plurality of teeth are received in a corresponding slot of the plurality of slots.

3. The method of claim 2, wherein each one of the plurality of teeth comprises an outer surface that is angled off the top surface of the self-locking washer at a predetermined pitch, such that when the oil fill extension tube is rotated clockwise the plurality of locking edges slide over the angled outer surface of each one of the plurality of teeth.

4. The method of claim 2, wherein rotating the oil fill extension tube counterclockwise with respect to the longitudinal axis is limited by each one of the plurality of locking edges bearing against a respective one of the plurality of teeth to prevent further rotation of the oil fill extension tube.

5. The method of claim 1, wherein the plurality of locking edges and the plurality of slots are disposed on a radially extending outer projection of the oil fill extension tube.

6. The method of claim 1, wherein the plurality of teeth are angled radially around the top surface of the self-locking washer in a clockwise direction with respect to a longitudinal axis of the oil fill extension tube.

7. The method of claim 1, wherein the plurality of teeth are evenly spaced on the top surface of the self-locking washer.

8. The method of claim 1, wherein the oil fill extension tube further comprises a longitudinally extending body comprising the first distal end and a second distal end, wherein the first distal end is externally threaded and the second distal end is internally threaded to removably receive an oil level stick.

9. An assembly for fastening an oil fill extension tube into an oil pan, the assembly comprising:
    a self-locking washer comprising a plurality of teeth disposed on a top surface of the self-locking washer and a locking extension disposed orthogonally to the top surface of the self-locking washer, wherein the self-locking washer is oriented over a threaded opening in the oil pan; and an oil fill extension tube comprising a plurality of locking edges, the plurality of locking edges disposed towards a first distal end of the oil fill extension tube and defining boundaries of a plurality of slots;

wherein the plurality of slots and the plurality of teeth are configured with respect to one another to be ratcheted together when the first distal end of the oil fill extension tube is threaded into the threaded opening of the oil pan; and wherein the locking extension is configured to securely engage a portion of the oil pan after the self-locking washer is oriented over the threaded opening.

10. The assembly of claim 9, wherein the plurality of teeth are configured to be received in a corresponding slot of the plurality of slots when the oil fill extension tube is rotated in a clockwise direction, with respect to a longitudinal axis of the oil fill extension tube.

11. The assembly of claim 10, wherein each one of the plurality of teeth comprises an outer surface that is angled off the top surface of the self-locking washer at a certain pitch, such that when the oil fill extension tube is rotated in the clockwise direction, the plurality of locking edges slide over the angled outer surface of each one of the plurality of teeth.

12. The assembly of claim 10, wherein rotation of the oil fill extension tube in a counterclockwise direction, with respect to the longitudinal axis, is limited by each one of the plurality of locking edges being configured to bear against a respective one of the plurality of teeth to prevent further rotation of the oil fill extension tube.

13. The assembly of claim 9, wherein the plurality of teeth is angled radially around the top surface of the self-locking washer in a clockwise direction with respect to a longitudinal axis of the oil fill extension tube.

14. The assembly of claim 9, wherein the oil fill extension tube further comprises a longitudinally extending body comprising the first distal end and a second distal end, wherein the first distal end is externally threaded and the second distal end is internally threaded to removably receive an oil level stick.

15. A self-locking washer for fastening an oil fill extension tube into an oil pan, the self-locking washer comprising:
a top surface;
a plurality of teeth disposed on the top surface; and
a locking extension disposed orthogonally to the top surface;
wherein the self-locking washer is oriented over a threaded opening in the oil pan;
wherein the locking extension is configured to securely engage a portion of the oil pan after the self-locking washer is oriented over the threaded opening;
wherein the oil fill extension tube comprises a longitudinally extending body comprising a first distal end and a second distal end, the first distal end being externally threaded, and a plurality of locking edges disposed towards the first distal end of the oil fill extension tube and defining boundaries of a plurality of slots.

16. The self-locking washer of claim 15, wherein the self-locking washer is configured to rotationally receive the oil fill extension tube, such that rotation of the oil fill extension tube in a clockwise direction, with respect to a longitudinal axis of the oil fill extension tube, ratchets together the plurality of slots and the plurality of teeth disposed on the top surface of the self-locking washer.

17. The self-locking washer of claim 16, wherein the self-locking washer is configured to limit rotation of the oil fill extension tube, such that rotation of the oil fill extension tube in a counterclockwise direction, with respect to the longitudinal axis, is limited by each one of the plurality of locking edges being configured to bear against a respective one of the plurality of teeth to prevent further rotation of the oil fill extension tube.

18. The self-locking washer of claim 15, wherein the oil fill extension tube comprises a plurality of ribs disposed towards the second distal end of the oil fill extension tube in order to aid in torgueing the oil fill extension tube within the self-locking washer.

* * * * *